(12) United States Patent
Tieftrunk et al.

(10) Patent No.: US 8,340,663 B2
(45) Date of Patent: Dec. 25, 2012

(54) METHOD AND SYSTEM FOR GROUND STATION SIGNAL HANDOVER FOR AIRCRAFT

(75) Inventors: Petr Tieftrunk, Brno (CZ); Michal Polansky, Brno (CZ)

(73) Assignee: Honeywell International Inc., Morristown, NJ (US)

( * ) Notice: Subject to any disclaimer, the term of this patent is extended or adjusted under 35 U.S.C. 154(b) by 340 days.

(21) Appl. No.: 12/790,190

(22) Filed: May 28, 2010

(65) Prior Publication Data

US 2011/0292907 A1     Dec. 1, 2011

(51) Int. Cl.
    *H04W 4/00*          (2009.01)
(52) U.S. Cl. ......... 455/431; 455/430; 455/456; 455/525
(58) Field of Classification Search .................. 455/456, 455/430, 431, 525; 370/395.4
See application file for complete search history.

(56) References Cited

U.S. PATENT DOCUMENTS

| | | | |
|---|---|---|---|
| 6,931,248 B2 | 8/2005 | Borel | |
| 7,313,143 B1 * | 12/2007 | Bruno | 370/395.4 |
| 7,359,703 B2 | 4/2008 | McGuffin et al. | |
| 8,103,271 B2 * | 1/2012 | Calderhead et al. | 455/431 |
| 2002/0004401 A1 * | 1/2002 | Heppe et al. | 455/456 |
| 2009/0186611 A1 | 7/2009 | Stiles et al. | |

FOREIGN PATENT DOCUMENTS

WO     0189114     11/2001

OTHER PUBLICATIONS

"Next Generation Data Link Applications", "NASA ICNS 2004 Conference", Apr. 29, 2004, Publisher: ARIC, Published in: Fairfax, VA, USA.
"VHF Digitial Link (VDL) Mode 2 Implementation Provisions: ARINC Specification 631-5", "ARINC ", Dec. 3, 2008, Publisher: Aeronautical Radio, Inc. , Published in: Annapolis, Maryland, USA.
Eddy et al. , "RFC5522—Network Mobility Route Optimization Requirements for Operational Use in Aeronautics and Space Exploration Mobile Networks", "http://www.faqs.org/rfcs/rfc5522.html", Oct. 2009.
Geurts, "Aircraft Operational Communications Know-How: CPDLC/ATN/VDLm2 Tutorial", Jan. 28-29, 2009, Publisher: SITA: Specialists in Air Transportation Communications and IT Solutions, Published in: Montego Bay, Jamaica.
"VDL Mode 2—A New Aeronautical Data Link ", "http://www.wavecom.ch/PDF/VDL-MODE%202.pdf", accessed May 10, 2010, pp. 1-4, Publisher: Wavecom Elektronik AG, Published in: Switzerland.

\* cited by examiner

*Primary Examiner* — David Q Nguyen
(74) *Attorney, Agent, or Firm* — Fogg & Powers LLC

(57) ABSTRACT

A method and system for ground station signal handoff for an aircraft. The method comprises receiving signal quality data and position data from each of a plurality of ground stations as a signal from each of the ground stations becomes detectable onboard the aircraft, while the aircraft is in communication with an active ground station. A position of the aircraft is determined each time a signal quality from one of the ground stations reaches a predetermined threshold indicating that the signal quality is suitable for handoff. A set of ground stations potentially suitable for handoff is identified based on their signal quality data when an insufficient signal quality of the active ground station is detected. The set of potentially suitable ground stations is evaluated based on their position and signal quality, and a trajectory or speed vector of the aircraft, to determine an optimal ground station for handoff. A handoff request is then transmitted to the optimal ground station.

17 Claims, 5 Drawing Sheets

METHOD AND SYSTEM FOR GROUND STATION SIGNAL HANDOVER FOR AIRCRAFT

BACKGROUND

The Aeronautical Telecommunications Network (ATN) is being progressively established around the world to provide for air-ground digital data communications. The ATN is dedicated to information exchange between aircraft and ground stations for activities such as Air Traffic Control (ATC), and Aeronautical Operational Communication (AOC). The ATN includes air-ground telecommunications facilities installed onboard aircraft, and ground stations equipped with air-ground telecommunications facilities. These air-ground telecommunications facilities providing a link between aircraft and ground stations constitute a subnetwork.

One such subnetwork is the Very High Frequency (VHF) Digital Link Mode 2 (VDLM2) subnetwork. In the near future, usage of the VDLM2 subnetwork will increase as VDLM2 was selected as the primary subnetwork for Controller Pilot Data Link Communications (CPDLC) in both the European Union and the United States. In addition, the VDLM2 subnetwork is being deployed in the Asia Pacific region. In order to meet the oncoming higher demand, new VDLM2 ground stations are being constructed by network operators such as Aeronautical Radio, Inc. (ARINC) and SociétéInternational de Télécommunications Aéronautiques (SITA). The need for optimal usage of the dense network of VDLM2 ground stations will grow dramatically in the future.

When using the VDLM2 subnetwork, there is a need to handover the communication link from one ground station to another. The algorithms currently in place determine when to handover, and which ground station is available for the handover. These algorithms work mostly with the strength of the ground station signal and with the trend of the signal strength, but are not always optimal because there are situations where more than one ground station may be suitable for handover. For example, all of the available ground stations may have a positive signal trend, but the one with the strongest signal may not be the best choice depending on the flight path of the aircraft. If a less than optimal ground station is selected, the number of handovers during aircraft flight will increase and the availability of the subnetwork will be diminished.

SUMMARY

A method and system for ground station signal handoff for an aircraft is provided. The method comprises receiving signal quality data and position data from each of a plurality of ground stations as a signal from each of the ground stations becomes detectable onboard the aircraft, while the aircraft is in communication with an active ground station. A position of the aircraft is determined each time a signal quality from one of the ground stations reaches a predetermined threshold indicating that the signal quality is suitable for handoff. A set of ground stations potentially suitable for handoff is identified based on their signal quality data when an insufficient signal quality of the active ground station is detected. The set of potentially suitable ground stations is evaluated based on their position and signal quality, and a trajectory or speed vector of the aircraft, to determine an optimal ground station for handoff. A handoff request is then transmitted to the optimal ground station.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

The present invention relates to a method and system that uses ground station location data in a ground station signal handover for aircraft. In one implementation, the ground station location data is used together with planned/predicted aircraft flight path data or an aircraft vector in an algorithm that determines the best handover time and the best ground station for handover. This approach allows for a decrease in the amount of ground station handovers during the flight of an aircraft, and increases the availability of the aviation network for other aircraft.

The present approach can be employed in various Very High Frequency (VHF) digital link subnetworks, such as the VHF Digital Link Mode 2 (VDLM2) subnetwork. The VDLM2 subnetwork provides digital communication protocols for use by a VHF transceiver and supporting avionics to exchange messages with an appropriately equipped ground system. Additional details of the VDLM2 subnetwork are described in ARINC Specification 631-5 (2008), the disclosure of which is incorporated herein by reference. When the present approach is implemented in a VDLM2 handover algorithm, the availability of the VDLM2 subnetwork is increased. The present approach can also be employed in other VHF digital link subnetworks, such as the VDLM3 and VDLM4 subnetworks.

The present method and system are described in further detail hereafter and with reference to the drawings.

Figure 1:
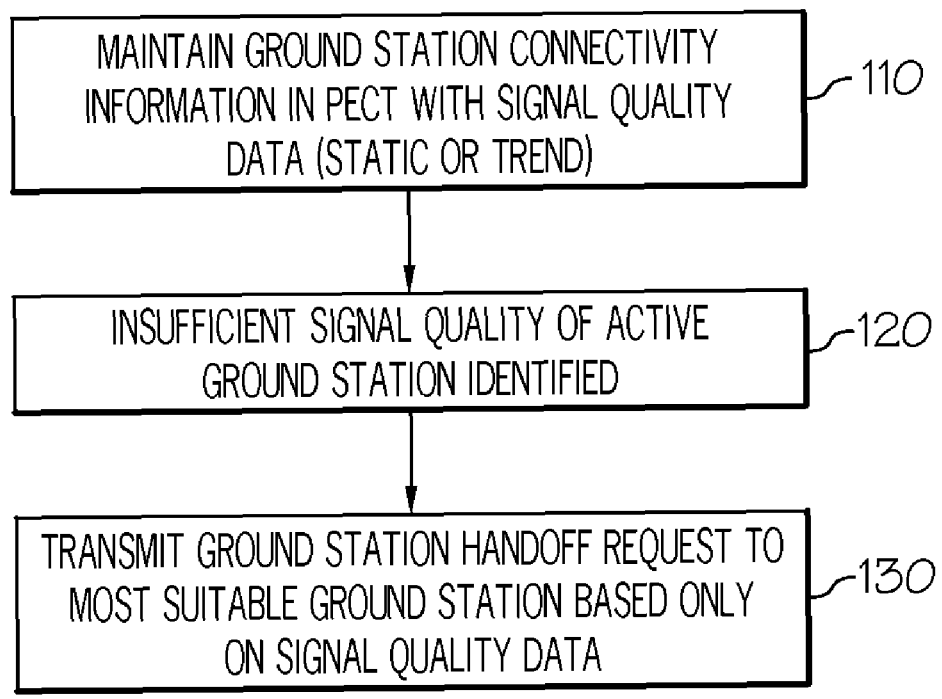
FIG. 1 is a process flow diagram for a conventional ground station handoff process.

FIG. 1 is a process flow diagram for a conventional ground station handoff process. The ground station connectivity information is maintained in a Peer Entity Contact Table (PECT) which includes signal quality data such as static or trend signal data (block 110). When an insufficient signal quality from an active ground station is identified (block 120), a ground station handoff request is transmitted to the most suitable ground station based only on signal quality data (block 130). In this conventional process, the planned/predicted flight path data is not used, resulting in a handover execution that is suboptimal.

As used herein, the "signal quality" from a ground station refers to the strength of the signal. The signal strength can be a static value, or a trending value that trends higher or lower. When a static signal strength is used, a threshold algorithm is employed such that when the signal quality drops under a pre-defined threshold (static signal strength<x), the signal strength is considered insufficient and a handover to another ground station is triggered. The trending value can be used by expanding the threshold algorithm. Instead of using (static signal strength<x), an expanded algorithm may be used: (static signal strength<y) and (trend decreasing signal strength).

Figure 2A:
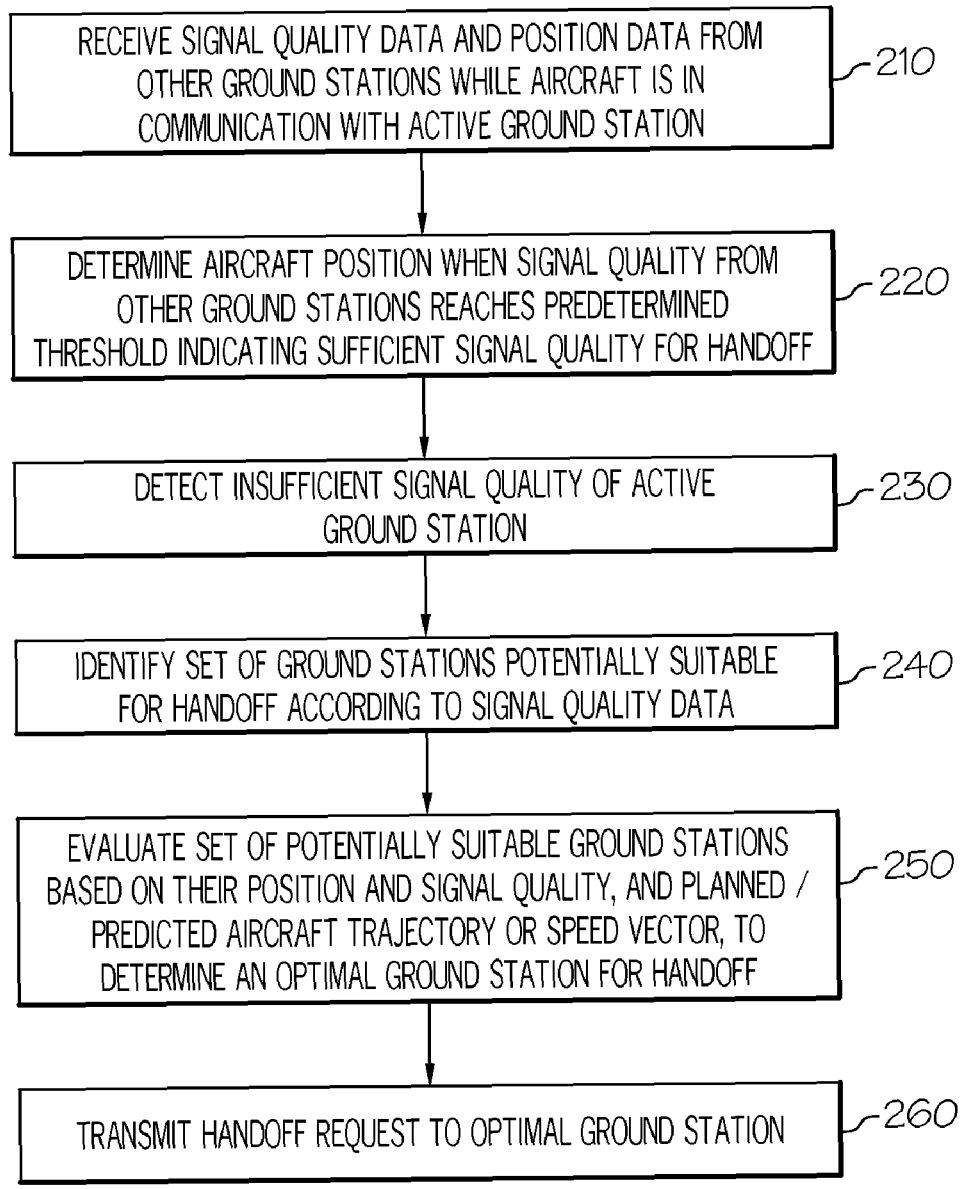
FIG. 2A is a process flow diagram for a ground station handoff process according to one approach.

FIG. 2A is a flow diagram for a ground station signal handoff process for aircraft according to the present approach. During flight, while an aircraft is in communication with an active ground station, signal quality data and position data are received from each of a plurality of other ground stations as the aircraft reaches the signal range of each of the other ground stations, such that a signal from the other ground stations becomes detectable onboard the aircraft (block 210).

The active ground station can be a VDLM2 ground station with an active connection to the aircraft. The signal quality data (static or trend) can be maintained in a PECT along with up-to-date position data such as received in a Ground Station Information Frame (GSIF) from a ground station ahead of or around the aircraft. In one embodiment, the PECT contains a list of VDLM2 ground stations and associated parameters such as the Signal Quality Parameter (SQP), supported Data Link Service Provider (DSP), and the Data Terminal Equipment (DTE) address. The ground station identifier and the SQP values in the PECT are typically updated in every transmission from the ground while the other VDLM2 parameters are typically updated based on the GSIF.

A position of the aircraft is determined each time the signal quality from one of the other ground stations reaches a predetermined threshold indicating sufficient signal quality for handoff (block 220). For example, for each ground station in the PECT, an aircraft position is recorded when the signal strength reaches a threshold, which can be a static or dynamic signal threshold. When an insufficient signal quality of the active ground station is identified (block 230), a set of ground stations potentially suitable for handoff is identified according to the signal quality data (block 240).

An evaluation of the set of potentially suitable ground stations is carried out based on their position and signal quality, and a planned/predicted trajectory or speed vector of the aircraft, to determine an optimal ground station for handoff (block 250). This evaluation is described in further detail with respect to the sub-process of FIG. 2B hereafter. Thereafter, a handoff request is transmitted from the aircraft to the optimal ground station (block 260).

Figure 2B:
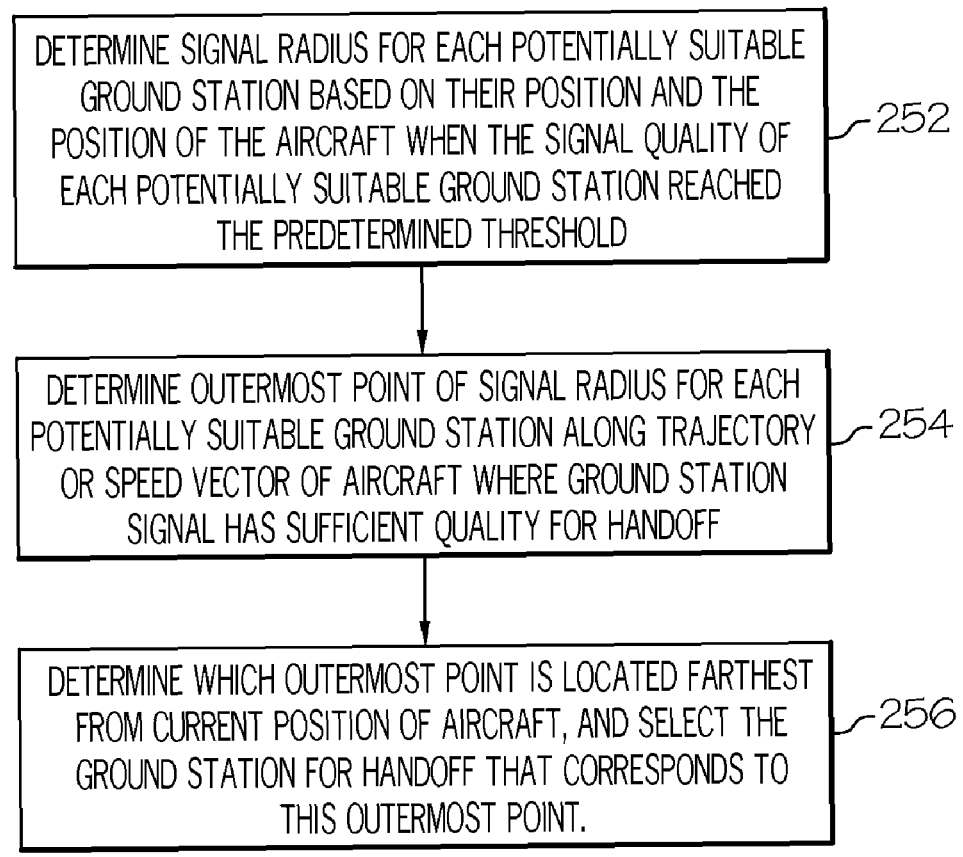
FIG. 2B is a process flow diagram for a sub-process of the ground station handoff process of FIG. 1A.
Figure 3:
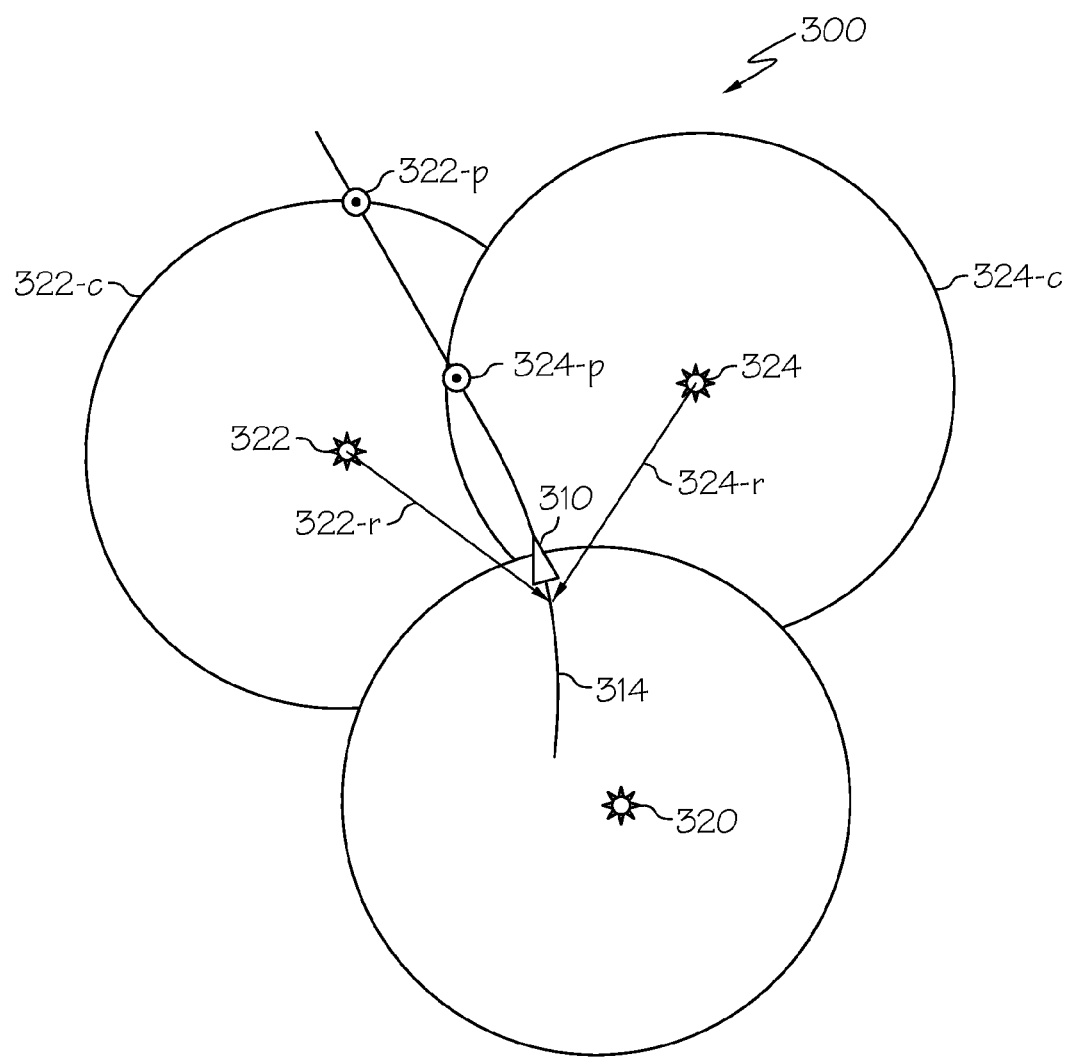
FIG. 3 is a schematic diagram of an airspace situation that illustrates a ground station handoff process.

FIG. 2B is a flow diagram for the sub-process carried out in the evaluation of the potentially suitable ground stations described above with respect to FIG. 2A. Initially, an effective signal radius is determined for each of the potentially suitable ground stations based on the position of each the ground stations and the position of the aircraft when the signal quality of the ground stations reached the predetermined threshold (block 252). An outermost point of the signal radius that is along the aircraft planned/predicted trajectory or speed vector is then determined for each of the potentially suitable ground stations where the ground station signal is expected to have sufficient quality for handoff (block 254). The outermost point of the signal radius can be determined as a cross section of the aircraft trajectory or vector and the circle defined by the signal radius around a particular ground station, such as shown in FIG. 3 (described hereafter). A determination is then made as to which outermost point is located farthest from the current position of the aircraft, and a ground station is selected for handoff that corresponds to this farthest outermost point (block 256).

FIG. 3 is a schematic diagram of an airspace situation 300 that illustrates one implementation of the present ground station handoff process. This particular scenario covers the situation when aircraft trajectory data are available. An aircraft 310 is traveling along a trajectory 314 while in communication with a currently active ground station 320. A pair of ground stations 322, 324, ahead of the aircraft, are preselected for handoff based on a sufficient quality of their signals. The signal radius 322-$r$, 324-$r$ is computed for each ground station 322, 324 based on their location and the aircraft location in the moment when the signal quality from each ground station reaches a predetermined threshold (or when other additional signal trend criteria are fulfilled).

The position of aircraft 310 is shown in FIG. 3 at the moment when the signal from ground station 320 has dropped below the threshold such that it has insufficient quality to support an effective communication link. The outermost points 322-$p$, 324-$p$ are computed for the signal radius of each ground station 322, 324 along trajectory 314 of aircraft 310. The outermost points 322-$p$, 324-$p$ are located where the trajectory 314 intersects circles 322-$c$, 324-$c$, which are defined by the signal radius around each ground station. In this scenario, the ground station 322 is selected for handoff as aircraft 310 will be within its signal radius for a longer time than the signal radius of ground station 324.

By selecting the ground station that can be used by the aircraft for a longer time, due to the ground station being closer to the future flight path of the aircraft, the number of handovers is decreased and the availability of the network is increased.

Figure 4:
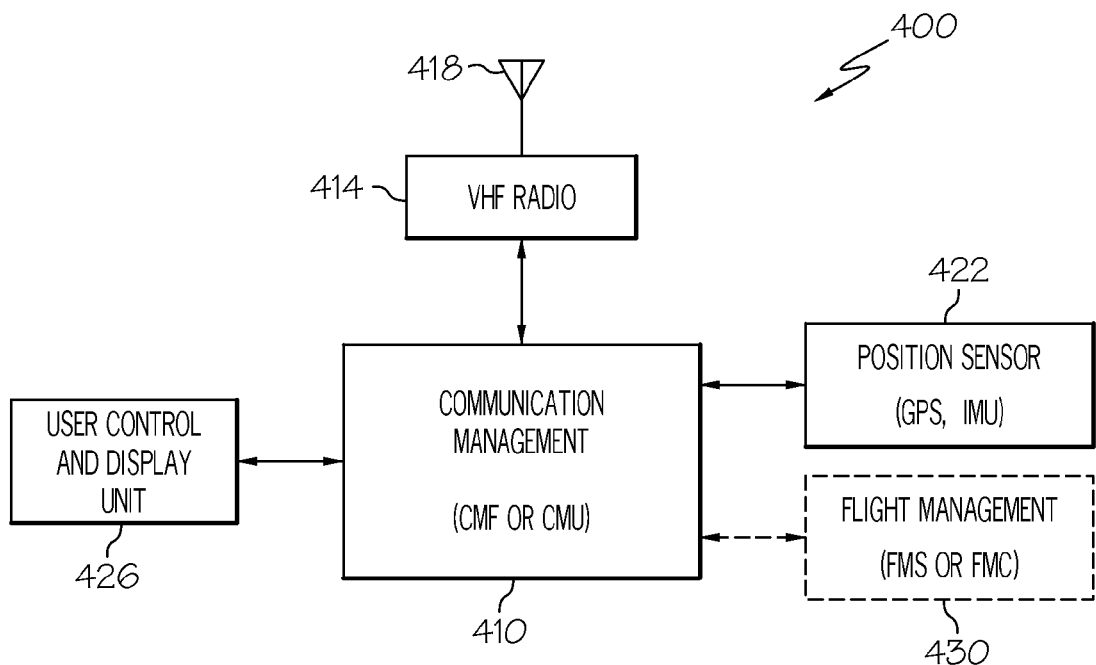
FIG. 4 is a block diagram of an avionics system according to one embodiment that can implement a ground station handoff process.

FIG. 4 is a block diagram of an avionics system 400 according to one embodiment that can implement the present ground station handoff process. The system 400 includes a communication management device 410 having at least one processor, such as a communication management function (CMF) or a communication management unit (CMU). A radio 414, such as a Very High Frequency (VHF) radio, having at least one antenna 418 is operatively coupled to communication management device 410. In an alternative embodiment, the radio and antenna can be integrated with communication management device 410. At least one aircraft position sensor 422 is operatively coupled to communication management device 410. The position sensor 422 can include a GPS receiver, one or more inertial sensors such as an inertial measurement unit (IMU), or both. A user control and display unit 426, such as a Multi-function Control and Display Unit (MCDU), is operatively coupled to communication management device 410 and implemented as a user interface.

The system 400 can optionally include a flight management device 430, such as a flight management system (FMS) or a flight management computer (FMC), and is operatively coupled to communication management device 410. When implemented, flight management device 430 provides aircraft planned/predicted trajectory data to communication management device 410.

During operation of system 400, the location data from the ground stations is received at radio 414. If the aircraft planned/predicted trajectory data is available from flight management device 430, the aircraft planned/predicted trajectory data is processed together with the ground station location data for evaluation of a preselected set of suitable ground stations. If the aircraft planned/predicted trajectory data is not available, evaluation of the preselected set of suitable ground stations can be performed based on the computed aircraft speed vector that is based on aircraft position information. The evaluation of the preselected set of suitable ground stations, based on their position and the planned/ predicted aircraft trajectory, or the speed vector computation, may be done in communication management device 410 or in flight management device 430 when employed.

The present approach can be implemented for aircraft by modifying conventional avionics software to add logic steps corresponding to the algorithm for performing the ground station handoff process disclosed herein.

A computer or processor used in the present method and system can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include or function with software programs, firmware, or other computer readable instructions for carrying out various process tasks, calculations, and control functions used in the present method and system.

The method of the invention can be implemented by computer executable instructions, such as program modules or components, which are executed by a processor. Generally, program modules include routines, programs, objects, data components, data structures, algorithms, and the like, which perform particular tasks or implement particular abstract data types.

Instructions for carrying out the various process tasks, calculations, and generation of other data used in the operation of the method and system of the invention can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable storage media may include, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code in the form of computer executable instructions or data structures.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method of ground station signal handoff for an aircraft, the method comprising:
receiving signal quality data and position data from each of a plurality of ground stations as a signal from each of the ground stations becomes detectable onboard the aircraft, while the aircraft is in communication with an active ground station;
determining a position of the aircraft each time a signal quality from one of the ground stations reaches a predetermined threshold indicating that the signal quality is suitable for handoff;
identifying a set of ground stations potentially suitable for handoff based on their signal quality data when an insufficient signal quality of the active ground station is detected;
evaluating the set of potentially suitable ground stations based on their position and signal quality, and a trajectory or speed vector of the aircraft, to determine an optimal ground station for handoff, wherein evaluating the set of potentially suitable ground stations comprises:
determining a signal radius for each of the potentially suitable ground stations based on their position and the position of the aircraft when the signal quality of each potentially suitable ground station reaches the predetermined threshold;
determining an outermost point of the signal radius for each of the potentially suitable ground stations along the trajectory or speed vector of the aircraft where the ground station signal has sufficient quality for handoff;
determining which outermost point of the signal radius for each of the potentially suitable ground stations is located farthest from a current position of the aircraft; and
selecting the ground station for handoff that has the outermost point of the signal radius located farthest from the current position of the aircraft; and
transmitting a handoff request to the optimal ground station.

2. The method of claim 1, wherein the outermost point of the signal radius for each of the potentially suitable ground stations is determined from a cross section of the trajectory or speed vector of the aircraft and a circle defined by the signal radius around each of the potentially suitable ground stations.

3. The method of claim 1, wherein the predetermined threshold is a static signal threshold.

4. The method of claim 1, wherein the predetermined threshold is a dynamic signal threshold.

5. The method of claim 1, wherein the aircraft and ground stations are configured for a VHF digital link subnetwork.

6. A system, comprising:
a radio having at least one antenna;
a communication management device operatively coupled to the radio and including at least one processor; and
at least one aircraft position sensor operatively coupled to the communication management device;
wherein the processor is configured to execute program instructions to perform a method of ground station signal handoff for an aircraft, the method comprising:
receiving signal quality data and position data from each of a plurality of ground stations when the aircraft is in signal range of each of the ground stations, while the aircraft is in communication with an active ground station;
determining a position of the aircraft each time a signal quality from one of the ground stations reaches a predetermined threshold indicating that the signal quality is suitable for handoff;
identifying a set of ground stations potentially suitable for handoff based on their signal quality data when an insufficient signal quality of the active ground station is detected;
evaluating the set of potentially suitable ground stations based on their position and signal quality, and a trajectory or speed vector of the aircraft, to determine an optimal ground station for handoff, wherein evaluating the set of potentially suitable ground stations comprises:

determining a signal radius for each of the potentially suitable ground stations based on their position and the position of the aircraft when the signal quality of each potentially suitable ground station reaches the predetermined threshold;

determining an outermost point of the signal radius for each of the potentially suitable ground stations along the trajectory or speed vector of the aircraft where the ground station signal has sufficient quality for handoff determining which outermost point of the signal radius for each of the potentially suitable ground stations is located farthest from a current position of the aircraft; and selecting the ground station for handoff that has the outermost point of the signal radius located farthest from the current position of the aircraft; and transmitting a handoff request to the optimal ground station.

7. The system of claim 6, further comprising a flight management device operatively coupled to the communication management device, the flight management device configured to transmit aircraft trajectory data to the communication management device.

8. The system of claim 7, wherein the flight management device comprises a flight management system (FMS) or a flight management computer (FMC).

9. The system of claim 6, further comprising a user control and display unit operatively coupled to the communication management device.

10. The system of claim 9, wherein the user control and display unit comprises a multi-function control and display unit (MCDU) implemented as a user interface.

11. The system of claim 6, wherein the radio comprises a very high frequency (VHF) radio.

12. The system of claim 6, wherein the communication management device comprises a communication management function (CMF) or a communication management unit (CMU).

13. The system of claim 6, wherein the aircraft position sensor comprises a GPS receiver, one or more inertial sensors, or both.

14. The system of claim 6, wherein the system is configured for a VHF digital link subnetwork.

15. The system of claim 6, wherein the outermost point of the signal radius for each of the potentially suitable ground stations is determined from a cross section of the trajectory or speed vector of the aircraft and a circle defined by the signal radius around each of the potentially suitable ground stations.

16. A computer program product, comprising:

a computer readable medium having instructions stored thereon executable by a processor to perform a method of ground station signal handoff, the method comprising:

receiving signal quality data and position data from each of a plurality of ground stations when the aircraft is in signal range of each of the ground stations, while the aircraft is in communication with an active ground station;

determining a position of the aircraft each time a signal quality from one of the ground stations reaches a predetermined threshold indicating that the signal quality is suitable for handoff;

identifying a set of ground stations potentially suitable for handoff based on their signal quality data when an insufficient signal quality of the active ground station is detected;

evaluating the set of potentially suitable ground stations based on their position and signal quality, and a trajectory or speed vector of the aircraft, to determine an optimal ground station for handoff, wherein evaluating the set of potentially suitable ground stations comprises:

determining a signal radius for each of the potentially suitable ground stations based on their position and the position of the aircraft when the signal quality of each potentially suitable ground station reaches the predetermined threshold;

determining an outermost point of the signal radius for each of the potentially suitable ground stations along the trajectory or speed vector of the aircraft where the ground station signal has sufficient quality for handoff;

determining which outermost point of the signal radius for each of the potentially suitable ground stations is located farthest from a current position of the aircraft; and selecting the ground station for handoff that has the outermost point of the signal radius located farthest from the current position of the aircraft; and transmitting a handoff request to the optimal ground station.

17. The computer program product of claim 16, wherein the outermost point of the signal radius for each of the potentially suitable ground stations is determined from a cross section of the trajectory or speed vector of the aircraft and a circle defined by the signal radius around each of the potentially suitable ground stations.

* * * * *